(No Model.) 2 Sheets—Sheet 1.
G. L. ARMBRISTER.
SEED AND FERTILIZER DISTRIBUTER.
No. 553,200. Patented Jan. 14, 1896.
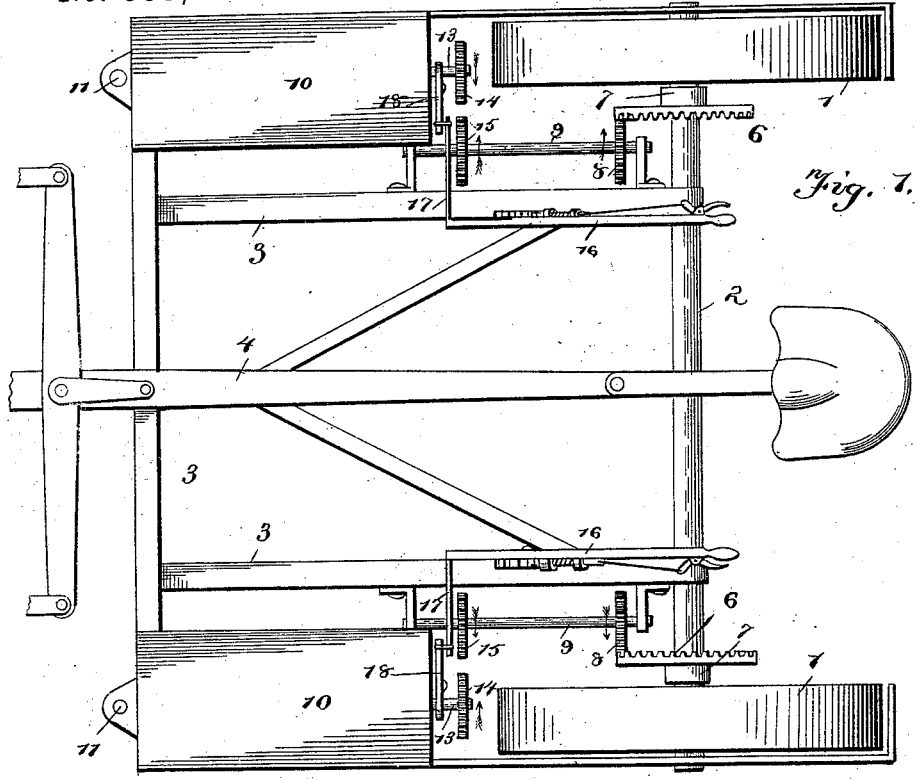
Fig. 1.
Fig. 2.
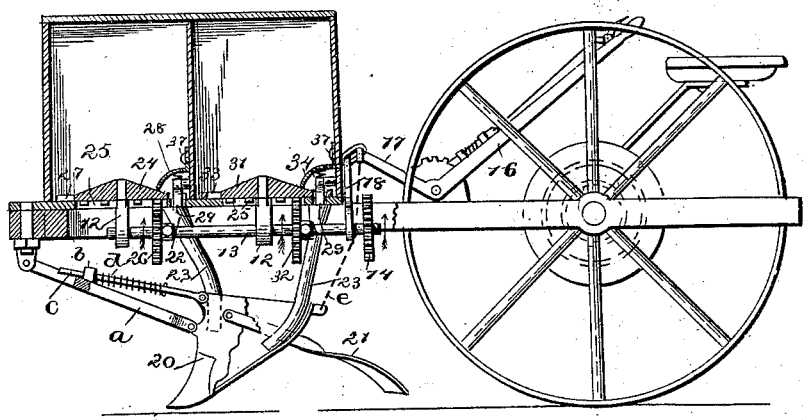
Witnesses: Inventor.

(No Model.) 2 Sheets—Sheet 2.
G. L. ARMBRISTER.
SEED AND FERTILIZER DISTRIBUTER.
No. 553,200. Patented Jan. 14, 1896.
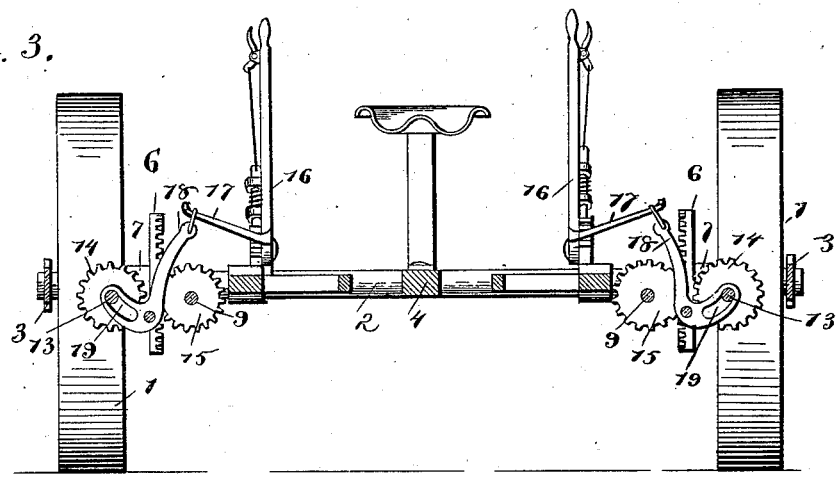
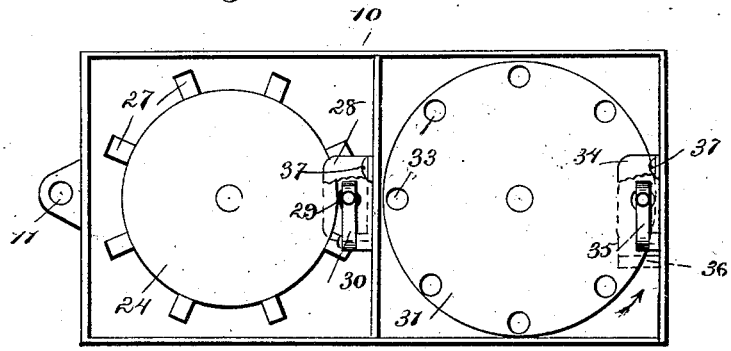
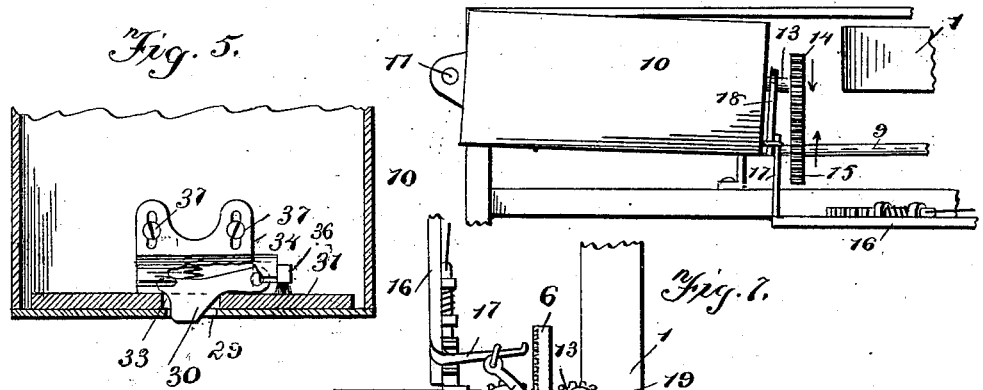
Witnesses:
Geo. E. Fuchs
James W. Berard
Inventor.
Geo. L. Armbrister
By Tatton and Nesbit
Attorneys

UNITED STATES PATENT OFFICE.

GEORGE LEE ARMBRISTER, OF WALTON FURNACE, VIRGINIA.

SEED AND FERTILIZER DISTRIBUTER.

SPECIFICATION forming part of Letters Patent No. 553,200, dated January 14, 1896.

Application filed June 8, 1895. Serial No. 552,166. (No model.)

*To all whom it may concern:*

Be it known that I, GEORGE LEE ARMBRISTER, of Walton Furnace, in the county of Wythe and State of Virginia, have invented certain new and useful Improvements in Seed and Fertilizer Distributers; and I do hereby declare the following to be a full, clear, and exact description of the invention, such as will enable others skilled in the art to which it pertains to make and use it, reference being had to the accompanying drawings, which form part of this specification.

My invention relates to improvements in seed and fertilizer distributers; and the object of the same is to provide an improved machine for distributing in two rows at the same time, the mechanism for each row being entirely separate and distinct from the other, so that either of two rows may be operated upon at the same time.

A further object is to provide an improved mechanism of simple construction for throwing the distributers in and out of operation, and also to provide improved devices for dropping the seed and fertilizer into the distributing-tube.

With these and other objects in view which will presently appear, my invention consists in the novel features of construction herein-after fully described and claimed, and illustrated in the accompanying drawings, in which—

Figure 1 is a plan view of the machine when out of gear. Fig. 2 is a side elevation showing one of the seed-boxes in longitudinal section. Fig. 3 is a vertical cross-sectional view of Fig. 1. Fig. 4 is a sectional plan view of one of the distributing-boxes. Fig. 5 is a cross-sectional view of one of the seed-boxes. Fig. 6 is a plan view of a portion of one side of the machine, showing the position of the seed-box and other mechanism when in gear. Fig. 7 is a sectional end view of the same.

The driving-wheels 1 are loosely mounted on axle 2, and extending forward from the latter is the main frame 3, also tongue 4, to which the forward portion of the main frame is secured. Mounted loosely on the axle adjacent the inner sides of wheels 1 are the gears 6 which are connected with wheels 1 by pawl and ratchets 7, (not fully shown,) so as to turn with the same when moving forward, but which remain motionless when the machine is being backed. The gear-wheels 6 carry two series of cogs, one within the other, and adapted to engage these cogs are the pinions 8 on the rear ends of the forwardly-extending shafts 9, supported in suitable bearing on frame 3.

The oblong seed and fertilizer boxes 10 are arranged on the main frame immediately in front of wheels 1, the same being secured thereto at their forward ends by pivots 11. Each box is divided into two compartments, the forward one being for fertilizer and the rear one for seed. Depending from the undersides of the boxes are brackets 12, in which are journaled the shafts 13, which extend longitudinally with the boxes and carrying at their rear ends pinions 14, which are adapted to mesh with the pinions 15 when the machine is in operation. Shafts 13 are for the purpose of actuating the seed and fertilizer distributing mechanism presently to be described.

The boxes 10 are secured pivotally to the machine-frame at 11, so as to move laterally, and thus disengage pinions 14 and 15 when the machine is thrown out of gear. For effecting this movement levers 16 are provided, which are suitably fulcrumed to the main frame, each being provided with the usual ratchet-holding mechanism. The lower short end of each lever is provided with the laterally-extending arm 17, to which is secured, by means of a link, lever 18, pivoted to the frame and provided at its lower end with the cam-slot 19, arranged eccentrically to the turning-point of the lever. Shaft 13 extends through this slot, and therefore when the lever 16 is drawn backward arm 17 will be raised, thus causing lever 18 to move shaft 13 laterally, the box turning upon its pivot, with the pinions 14 and 15 disengaged. The furrow-openers 20 beneath the seed-boxes are pivotally secured at their front edges to links *a*, bifurcated at their forward ends, where they are pivoted to the frame, as shown. Through these openers depend flexible tubes 23 from funnels 22. On links *a* are perforated lugs *b*, through which extend arms *c*, pivotally secured to openers 20, and arranged on the arms are springs *d*, which press the upper portions of openers 20 backward and their lower ends forward into the ground. Thus the openers may yield when an obstruction is encountered, so as not to be broken. Furrow-closers 21 depend from the rear of openers 20 and effectually cover the seed deposited by the planter.

Openers 20 are connected by chains e to arms 17, so that when the levers 16 are drawn backward for throwing the machine out of gear the said parts are raised from engagement with the ground, while a reverse movement of levers 16 throws the parts in operation, as well as lowers the furrow openers and closers, as will be understood. By means of this arrangement it will be seen that either one of the planting mechanisms may be thrown in and out of gear independently of the other, or both may be operated at the same time by moving simultaneously both of the levers 16.

Brackets 12 beneath the fertilizer-compartments form the pivotal points for the seed-disks 24, which turn in the bottom of the boxes, each disk being provided on its under side with two series of cogs 25. These cogs are engaged by pinions 26 on shaft 13, the said pinion being adjusted to engage the inner one of the series when the disk is to be moved rapidly for dropping a considerable quantity of fertilizer, while for dropping a smaller quantity it is moved outward to engage the outer series of cogs, as will be understood. The periphery of disk 24 is provided with the short radial arms 27, which carry the fertilizer beneath the shield 28, arranged over discharge 29 of the box, and for causing the fertilizer to drop through the opening 29 I provide the pivoted dog 30, having a spring arranged at its top to force the fertilizer down out of the disk as the radial arms pass beneath it. Its forward end is made tapering or wedge-shaped, so as to be readily pushed up by arms 27 when reached by the latter.

The seed-dropping disks 31 are mounted on brackets 12 in a manner similar to the fertilizer-dropping disks, and each is formed with two series of cogs on its under side to engage the pinion 32 on shaft 13, the cogs being for the purpose of driving the disks either fast or slow, as explained of the fertilizer-disks. The seed-disk, however, is provided with a series of peripheral openings 33, into which the seeds become lodged, and by which they are carried beneath shields 34, where the seed is dropped into the planting-tube. Spring-actuated dog 35 forces the seed from the disk, while brushes 36 prevent more seed from entering beneath the shields than is lodged in said openings. The shields over the fertilizer and seed openings are adjustable vertically, as shown, by means of set-screws 37, the shields being provided with vertical arms slotted to permit of said adjustment.

Having thus fully described my invention, what I claim as new, and desire to secure by Letters Patent, is—

1. In a planter, the combination of the main frame, actuating gearing thereon, the laterally movable seed boxes, the planting disks on their under sides, shafts 13 carrying gears for rotating the disks, levers 18 fulcrumed on the main frame adjacent the shafts 13 and formed with cam slots 19 which embrace said shafts, said levers serving, according to the direction of their movement, to throw the said shafts and boxes laterally either into or out of engagement with the actuating gearing on the main frame, substantially as shown and described.

2. In a corn planter, the combination of a frame, and actuating gear, a dropping mechanism movable laterally into or out of engagement with the actuating gear, and the lever 18 fulcrumed to the frame and formed with slot 19 where it embraces a projection from the said dropping mechanism for adjusting the latter, substantially as shown and described.

3. In a planter, the combination of the drive wheels and axle rotated thereby, gears 6 on the axle, the frame, the short shafts 9 journaled to the frame and disposed at right angles to the axle, gears 8 on the rear ends of said short shafts which mesh with gears 6, gears 15 on the forward ends of the shafts, the seed boxes pivoted at their forward ends to the frame, dropping mechanisms carried by the boxes, gears 14 adapted to mesh with said gears 15 for actuating the dropping mechanism, and mechanisms for moving said gears 14 and seed boxes toward and away from said gears 15, substantially as shown and described.

4. The combination in a planter, of the main frame, the actuating mechanism carried thereby, the laterally movable seed boxes, a dropping mechanism, the shaft arranged longitudinally beneath each box and extended parallel with the main frame, levers 18 fulcrumed on the main frame, and extending transverse thereof and formed with slots 19 which embrace the shafts beneath the seed boxes, the hand levers 16 and the lateral arms 17 thereon connected to the levers 18, substantially as shown and described.

In testimony whereof I affix my signature in presence of two witnesses.

GEORGE LEE ARMBRISTER.

Witnesses:
J. R. HUDSON,
W. C. REPASS.